United States Patent
Son

(10) Patent No.: US 7,607,161 B2
(45) Date of Patent: Oct. 20, 2009

(54) CABLE RECEIVER

(75) Inventor: Tae-Yong Son, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 455 days.

(21) Appl. No.: 11/375,051

(22) Filed: Mar. 15, 2006

(65) Prior Publication Data

US 2007/0022458 A1  Jan. 25, 2007

(30) Foreign Application Priority Data

Jul. 21, 2005 (KR) .................. 10-2005-0066468

(51) Int. Cl.
*H04N 7/173* (2006.01)
(52) U.S. Cl. .............. 725/110; 725/111; 725/114; 725/120
(58) Field of Classification Search ............. 725/105, 725/110, 111, 112, 114, 120, 131
See application file for complete search history.

(56) References Cited

U.S. PATENT DOCUMENTS

2002/0083470 A1  6/2002  Lu
2002/0184650 A1* 12/2002  Stone .................. 725/131
2003/0066085 A1*  4/2003  Boyer et al. .......... 725/104
2005/0060749 A1   3/2005  Hong et al.

FOREIGN PATENT DOCUMENTS

| EP | 1 478 172 | 11/2004 |
| KR | 2000-0037654 | 7/2000 |
| KR | 2002-0037780 | 5/2002 |

* cited by examiner

*Primary Examiner*—Brian Ensey
(74) *Attorney, Agent, or Firm*—Roylance, Abrams, Berdo & Goodman, LLP

(57) ABSTRACT

A cable receiver is disclosed that comprises a multimedia channel unit to receive a multimedia signal, and a multimedia processor to process the multimedia signal. The cable receiver further comprises a cable modem to perform data communication with an information provider that provides appendix information about the multimedia signal and a Web server that hosts a predetermined Web page through a cable network. An information processor adds appendix information to the multimedia signal, and a Web browser transmits request information received for the Web page according to a user's selection and processes the received Web page for the user. The cable receiver further comprises a controller to control data transmission of the cable modem, the information processor, and the Web browser to transmit the appendix information and the Web page to the information processor and the Web browser. Thus, the present invention provides a cable receiver capable of supporting Internet service without incurring the additional cost associated with a cable modem.

4 Claims, 3 Drawing Sheets

CABLE RECEIVER

PRIORITY

This application claims the benefit under 35 U.S.C. § 119 (a) of Korean Patent Application No. 2005-0066468, filed on Jul. 21, 2005, in the Korean Intellectual Property Office, the entire disclosure of which is hereby incorporated by reference.

BACKGROUND OF THE INVENTION

1. Field of the Invention

The present invention relates to cable receivers. More particularly, the present invention relates to cable receivers capable of supporting Internet service without an additional cost.

2. Description of the Related Art

A cable receiver such as a cable set-top box, a cable-ready television, or the like, receives a cable broadcasting signal composed of audio and video signals, and properly processes the received cable broadcasting signal to provide picture and sound. FIG. 1 illustrates a cable television system 1 connected to a conventional cable receiver.

As shown in FIG. 1, a multiple services operator (MSO) 11 provides multimedia service for picture and sound, and various cable television services such as data service for information based on data. Further, an internet service provider (ISP) 12 provides Internet service. A headend 14 is used for a cable television headend and receives a cable television signal from the cable television system, thereby processing and distributing it. The headend 14 receives a service signal from the MSO 11 and/or the ISP 12 while performing data communication with the MSO 11 and/or the ISP 12 through the Internet protocol (IP) network 13. Headend 14 retransmits the service signal to a cable network 15 as a local cable infrastructure.

A cable set-top box 16 or a cable ready television 18 receives the cable television signal from the headend 14 using the cable network 15. A television 17 or cable ready television 18 provides a user with picture, sound and data service on the basis of the signal processed. Meanwhile, a cable modem 19 receives and processes an Internet service signal through the cable network 15, and transmits it to a personal computer (PC) 20, thereby providing a user with Internet service. Thus, the conventional cable receiver receives just the cable television signal, and processes and outputs it, but cannot directly process and provide Internet service. That is, the conventional cable receiver should additionally include cable modem 19 in order to provide internet service, which increases production cost.

SUMMARY OF THE INVENTION

Accordingly, it is an aspect of the present invention to provide a cable receiver capable of supporting Internet service without incurring additional cost. This and other aspects of the present invention can be achieved by providing a cable receiver comprising a multimedia channel unit to receive a multimedia signal, and a multimedia processor to process the multimedia signal. The cable receiver further comprises a cable modem to perform data communication with an information provider that provides appendix information about the multimedia signal and a Web server that hosts a predetermined Web page, through a cable network. The cable receiver further comprises an information processor to add the appendix information to the multimedia signal, a Web browser to transmit receiving request information for the Web page according to a user's selection, and process the received Web page to be used by a user. The cable receiver additionally comprises a controller to control data transmission of the cable modem, the information processor, and Web browser to transmit the appendix information and Web page to the information processor and Web browser.

According to another exemplary embodiment of the present invention, the cable receiver further comprises a data channel unit to transmit the appendix information to the information processor by performing data communication with the information provider through the cable network.

According to another exemplary embodiment of the present invention, the data channel unit is configured to transmit data about the appendix information from the information processor to the information provider through the cable network.

According to another exemplary embodiment of the present invention, the cable receiver further comprises a display unit to display a picture based on the multimedia signal processed by the multimedia processor, and the Web page processed by the Web browser.

BRIEF DESCRIPTION OF THE DRAWINGS

The above and other aspects, exemplary features and advantages of the present invention will become apparent and more readily appreciated from the following description of certain exemplary embodiments thereof, taken in conjunction with the accompany drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
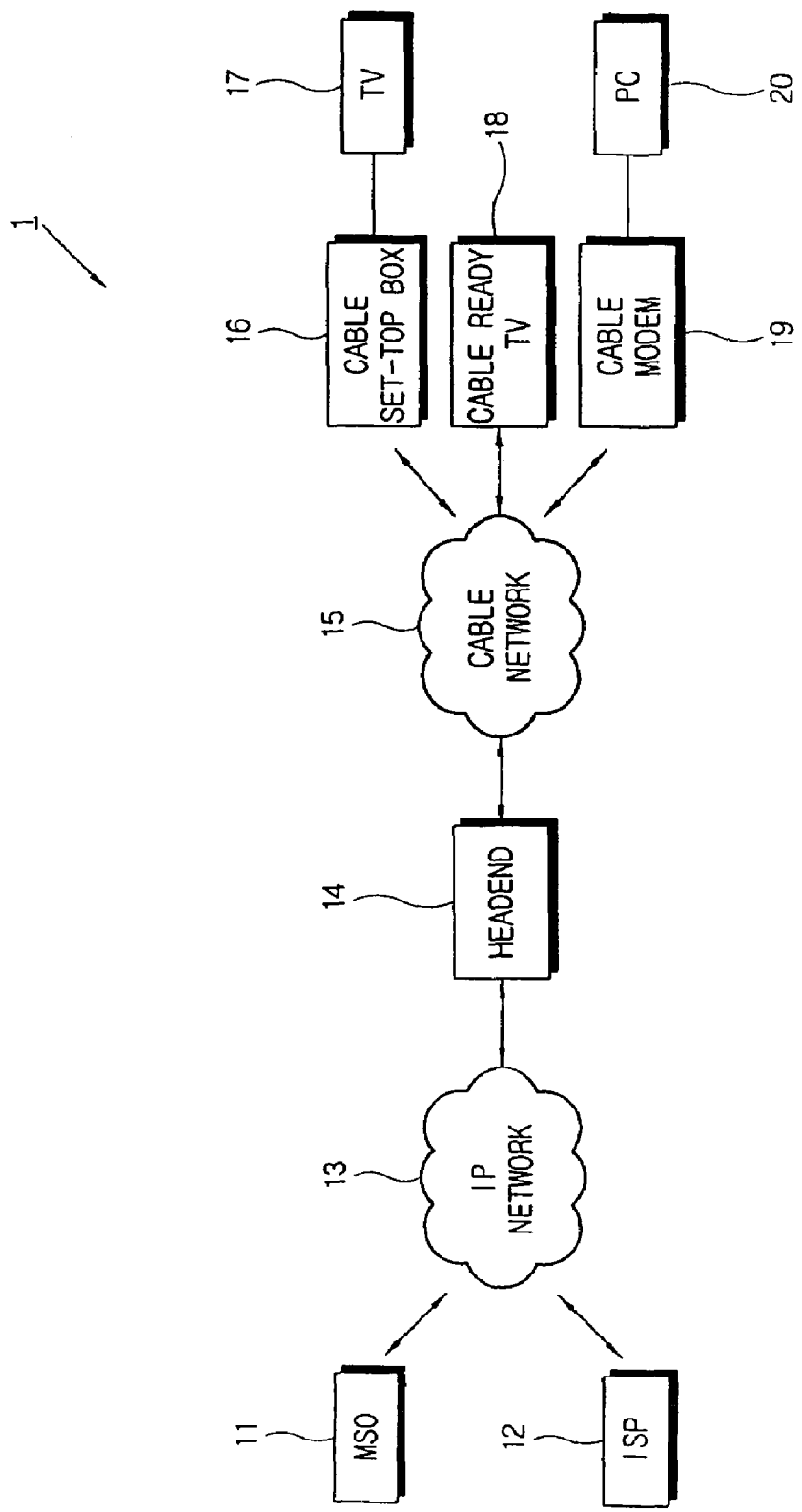
FIG. 1 is a block diagram illustrating a conventional cable television system.
Figure 2:
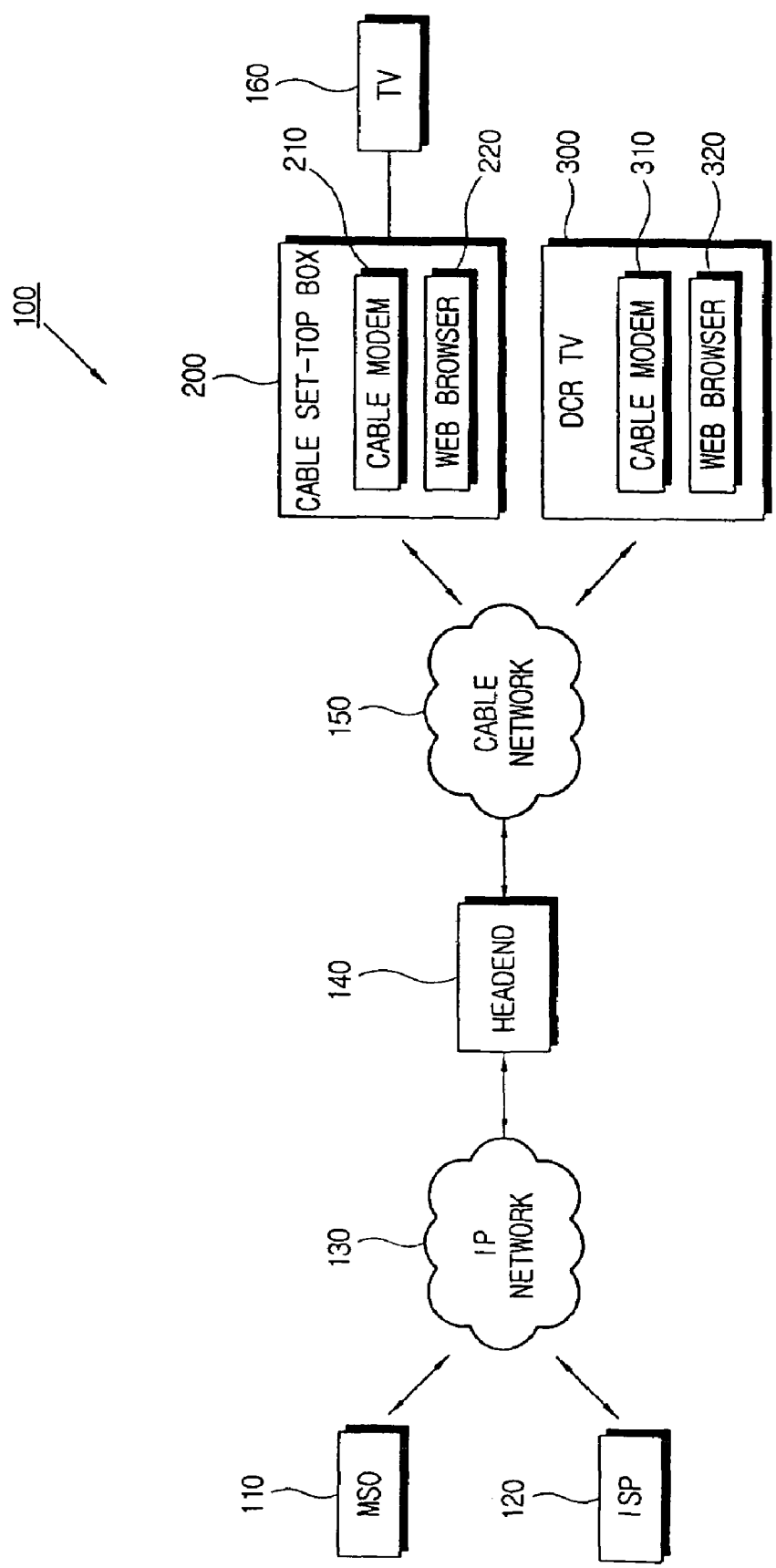
FIG. 2 is a block diagram illustrating a cable television system according to an exemplary embodiment of the present invention.

FIG. 2 is a block diagram illustrating a cable television system 100 according to an exemplary embodiment of the present invention. A multiple services operator (MSO) 110 provides multimedia service for picture and sound, and cable television service, such as data service for information based on data. Further, an Internet service provider (ISP) 120 provides Internet service. The headend 140 receives a service signal from the MSO 110 and/or ISP 120 while performing data communication with the MSO 110 and/or ISP 120 through an internet protocol (IP) network 130, and retransmits the service signal to a cable network 150.

The headend 140 executes quadrature amplitude modulation (QAM) for the cable television signal to transmit. The headend 140 is provided with a cable modem termination system (CMTS), thereby having the capacity for implementing high-speed data service. The CMTS employs an Ethernet interface for the IP network 130, and a coaxial radio frequency (RF) interface for the cable network 150. According to an exemplary embodiment of the present invention, a hybrid fiber coax (HFC) is employed for signal transmission of the cable network 150, and transmits a radio frequency (RF) signal therethrough.

A cable set-top box 200 and a digital cable-ready (DCR) television 300 receive an RF signal through the cable network 150. Here, the cable set-top box 200 and the DCR television 300 are described as examples of the cable receiver. The cable set-top box 200 and the DCR television 300 extract a cable television service signal from the RF signal received through the cable network 150, and process multimedia data including video and audio data on the basis of the extracted cable television service signal, thus outputting picture and sound. Further, the cable set-top box 200 and the DCR television 300 extract a data service signal from the received RF signal, and add appendix information to the multimedia data on the basis of the extracted data service signal.

The cable set-top box 200 includes a cable modem 210 and a Web browser 220. Also, the DCR television 300 includes a cable modem 310 and a Web browser 320. The cable set-top box 200 and the DCR television 300 receive an Internet service signal while communicating data with the ISP 120, thereby allowing a user to access Internet. The cable set-top box 200 is connected to a television 160 and transmits a processed video signal, an audio signal, and Internet data to the television 160.

Figure 3:
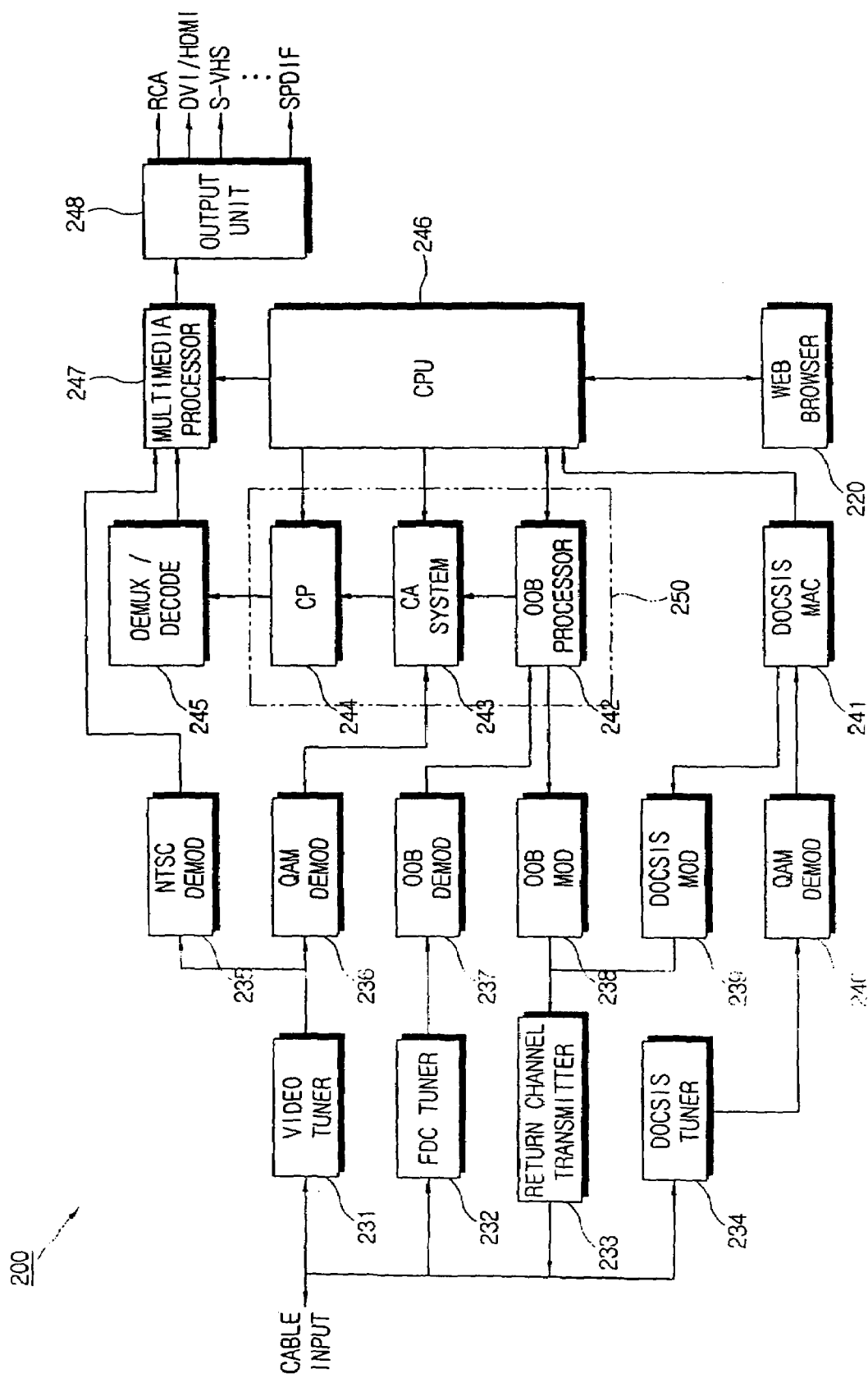
FIG. 3 is a block diagram schematically illustrating a configuration of a cable set-top box according to an exemplary embodiment of the present invention.

FIG. 3 is a block diagram schematically illustrating a configuration of a cable set-top box 200 according to an exemplary embodiment of the present invention. According to an exemplary embodiment of the present invention, the cable set-top box 200 includes a video tuner 231, a forward data channel (FDC) tuner 232, a return channel transmitter 233, a data over cable service interface specification (DOCSIS) tuner 234, a national television system committee (NTSC) demodulator (DEMOD) 235, a quadrature amplitude modulation (QAM) DEMOD 236, an out-of-band (OOB) DEMOD 237, an OOB modulator (MOD) 238, a DOCSIS MOD 239, a QAM DEMOD 240, a DOCSIS media access control (MAC) 241, an OOB processor 242, a conditional access (CA) system 243, a copy protection (CP) 244, a demultiplexer (DEMUX)/decoder (DECODE) 245, a central processing unit (CPU) 246, a multimedia processor 247, an output unit 248, an input unit 260, and a Web browser 220. The video tuner 231 selects and receives a preset frequency signal in the RF signal transmitted through the cable network 150. The video tuner 231 receives a signal having a frequency corresponding to a multimedia service signal provided from the MSO 110, for example, a signal having a frequency of 54 MHz through 864 MHz, and outputs the signal to the NTSC DEMOD 235. The NTSC DEMOD 235 receives the signal output from the video tuner 231 and performs a process such as demodulation or the like. The NTSC DEMOD 235 processes an analog channel signal among the signals output from the video tuner 231. The QAM DEMOD 236 processes a digital channel signal among the signals output from the video tuner 231, and demodulates the digital channel signal by 64-QAM or 256-QAM to output it.

The FDC tuner 232 selects a signal having a frequency of 70 MHz through 130 MHz that was transmitted through an OOB FDC channel, and receives a signal having an OOB message. According to an exemplary embodiment of the present invention, the OOB message contains a control and information message transmitted from the MSO 110 to the cable set-top box 200, and includes, for example, a conditional access (CA) message for controlling authority to use the cable television service, a system information (SI) message, an electronic program guide (EPG) message, and/or an emergency alert system (EAS) message. Here, the MSO 110 is described as an example of an information provider, and the OOB message is described as an example of appendix information. The OOB DEMOD 237 receives the signal output from the FDC tuner 232 and demodulates the signal to output the OOB message. The OOB DEMOD 237 can, for example, implement quadrature phase-shift keying in demodulation of the OOB message. In this exemplary embodiment, the FDC tuner 232 and the OOB DEMOD 237 are described as an example of a data channel unit.

The OOB processor 242 receives the OOB message from the OOB DEMOD 237, and decodes and processes the OOB message through predetermined protocol. The CA system 243 receives the multimedia data from the QAM DEMOD 236, and controls the authority to use the multimedia data according to the direction of the OOB processor 242 based on the OOB message. The CP 244 protects the multimedia data from duplication. Here, the OOB processor 242, the CA system 243, and the CP 244 are described as an information processor, and can be realized by a cable card 250.

When there is no cable card, the DEMUX/DECODE 245 performs demultiplexing and performs decoding for the multimedia data transmitted from the CA system 243. The multimedia processor 247 performs, for example, NTSC encoding, graphic processing, vertical blanking interval (VBI) data inserting, AC-3 decoding, and image processing for the multimedia data output from the NTSC DEMOD 235 and the DEMUX/DECODE 245. The output unit 248 outputs the signal processed by the multimedia processor 247 and having various video and audio formats such as, for example, RCA, DVI/HDMI, S-VHS, S/PDIF. Here, the video tuner 231, the NTSC DEMOD 235, and the QAM DEMOD 236 are described as an example of a multimedia channel unit.

Meanwhile, when there is upstream transmission in a reverse data channel (RDC) from the cable set-top box 200 to the MSO 110 via the headend 140, the OOB MOD 238 and the return channel transmitter 233 modulate and transmit the data to be transmitted from the OOB processor 242.

When the OOB message is received from the MSO 110 through a DOCSIS set-top gateway (DSG) channel, the DOCSIS tuner 234 receives a signal having a frequency corresponding to a downstream channel of the DSG channel, for example, a signal having a frequency of 54 MHz through 864 MHz, and outputs it. The QAM DEMOD 240 can use the 64-QAM or the 256-QAM to demodulate the signal output from the DOCSIS tuner 234 and to output it. The DOCSIS MAC 241 is interposed between the QAM DEMOD 240 and the CPU 246, and performs data communication for the OOB message with a DSG server provided in the MSO 110 through the CMTS according to a suitable protocol, such as that provided by the DSG interface specification of CableLabs, the entire disclosure of which is hereby incorporated by reference. The DOCSIS MAC 241 communicates the data with the CPU 246 through the Ethernet interface. Then, the CPU 245 controls the signal, which is obtained by the data communication of the DOCSIS MAC 241, to be transmitted to the OOB processor 242. Further, the OOB processor 242 processes the OOB message included in the received signal. In the meantime, when there is upstream transmission in the DSG channel from the cable set-top box 200 to the MSO 110, or the ISP 120 via the headend 140, the DOCSIS MAC 241 uses the DOCSIS MOD 239 to modulate the signal and uses the return channel transmitter 233 to transmit the modulated signal. In this exemplary embodiment, the DOCSIS tuner 234, the QAM DEMOD 240, the DOCSIS MAC 241, the DOCSIS MOD 239, and the return channel transmitter 233 are included in the cable modem 210.

The Web browser 220 communicates data with a predetermined Web server according to a suitable protocol such as hypertext transfer protocol (HTTP), thereby allowing a user to access a Web page or the like hosted by a Web server provided by the ISP 120. In this case, the cable modem 210 is used in performing data communication according to sub-network protocol, such as a data link layer, needed for transmitting data between the Web browser 220 and the Web server. When a user selects the Web page hosted by the Web server through the input unit 260, the CPU 246 controls the data transmission of the Web browser 220 and the cable modem 210 to receive the Web page from the Web server. Here, the CPU 246 can transmit the Web page received by the Web browser as a file format to the television 160. In this exemplary embodiment, the Web browser may be implemented by a software application.

The DCR television 300 may have the same configuration as that of the foregoing cable set-top box 200. Further, the DCR television 300 displays the Web page received by the Web browser 220 on a display unit, thus allowing a user to see the Web page.

Thus, when the DSG channel, as well as the OOB FDC channel, is selected for transmitting and processing the appendix information about a multimedia signal such as the OOB message. The cable receiver for processing the multimedia signal should include the cable modem, which performs the data communication based on DOCSIS, in order to process such appendix information. The DOCSIS cable modem is not different in structure from a cable modem needed for performing the data communication based on Internet protocol through a cable network. Therefore, when the Web browser is added to the cable receiver having the cable modem for DSG operation, the cable receiver can support the Internet service without incurring the additional cost of a traditional cable modem. The present invention therefore provides a cable receiver capable of supporting Internet service without incurring additional cost.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. A cable receiver comprising:
   a multimedia channel unit to receive a multimedia signal;
   a multimedia processor to process the multimedia signal;
   a cable modem to perform data communication through a cable network with an information provider that provides information comprising appendix information about the multimedia signal and a Web server that hosts a Web page;
   an information processor to extract the appendix information from an RF signal and to add the appendix information to the multimedia signal;
   a Web browser to transmit request information for a selected Web page and process the selected Web page; and
   a controller to control data transmission of the cable modem, the information processor, and the Web browser to transmit the appendix information and the Web page to the information processor and the Web browser;
   wherein the appendix information includes appendix information for granting authority to access the multimedia signal.

2. The cable receiver according to claim 1, further comprising a data channel unit to transmit the appendix information to the information processor by performing data communication with the information provider through the cable network.

3. The cable receiver according to claim 2, wherein the data channel unit transmits the appendix information from the information processor to the information provider through the cable network.

4. The cable receiver according to claim 1, further comprising a display unit to display a picture based on the multimedia signal processed by the multimedia processor and the Web page processed by the Web browser.

* * * * *

UNITED STATES PATENT AND TRADEMARK OFFICE
CERTIFICATE OF CORRECTION

| | | |
|---|---|---|
| PATENT NO. | : 7,607,161 B2 | Page 1 of 1 |
| APPLICATION NO. | : 11/375051 | |
| DATED | : October 20, 2009 | |
| INVENTOR(S) | : Tae-Yong Son | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 618 days.

Signed and Sealed this

Twelfth Day of October, 2010

David J. Kappos
*Director of the United States Patent and Trademark Office*